United States Patent [19]

Freni, Jr. et al.

[11] Patent Number: 4,807,842
[45] Date of Patent: * Feb. 28, 1989

[54] TILT APPARATUS FOR A DISPLAY MONITOR FIELD

[75] Inventors: Joseph L. Freni, Jr., Dracut; John D. Ardito, Bedford, both of Mass.

[73] Assignee: Wang Laboratories, Inc., Lowell, Mass.

[*] Notice: The portion of the term of this patent subsequent to Nov. 24, 2004 has been disclaimed.

[21] Appl. No.: 103,619

[22] Filed: Sep. 30, 1987

Related U.S. Application Data

[63] Continuation of Ser. No. 846,336, Mar. 31, 1986, Pat. No. 4,708,318.

[51] Int. Cl.⁴ .................................................. F16M 5/00
[52] U.S. Cl. .................................... 248/649; 248/371; 248/395; 248/648
[58] Field of Search ............... 248/649, 648, 652, 655, 248/371, 395, 161, 162.1, 631, 372.1; 108/1, 2

[56] References Cited

U.S. PATENT DOCUMENTS

| | | | |
|---|---|---|---|
| 4,076,201 | 2/1978 | Hudnall | 248/162.1 |
| 4,365,779 | 12/1982 | Bates et al. | 248/371 |
| 4,368,867 | 1/1983 | Pendleton et al. | 248/395 X |
| 4,372,515 | 2/1983 | Noonan | 248/371 X |
| 4,408,800 | 11/1983 | Knapp | 297/347 X |
| 4,471,931 | 9/1984 | Covey et al. | 248/125 |
| 4,556,189 | 12/1985 | Kirpluk et al. | 248/649 |
| 4,570,892 | 2/1986 | Czech et al. | 248/372.1 |
| 4,611,777 | 9/1986 | Ireland et al. | 248/162.1 X |
| 4,643,382 | 2/1987 | Ojima et al. | 248/371 |
| 4,691,886 | 9/1987 | Wendling et al. | 248/162.1 X |
| 4,708,313 | 11/1987 | Freni, Jr. et al. | 248/648 X |

*Primary Examiner*—Ramon O. Ramirez
*Attorney, Agent, or Firm*—Michael H. Shanahan; Kenneth L. Milik

[57] ABSTRACT

A tilt apparatus allows an operator to readily change the tilt angle of a display monitor and retain the angle after it is changed. The tilt apparatus mounts vertically to the display monitor housing at the rear of the monitor's pivot point and center of gravity. The apparatus includes a piston and spring assembly which counterbalances shifting in the monitor's center of gravity during the manual tilting of the monitor to provide continuously variable adjustment throughout a predefined tilt range. The apparatus also includes frictional drag means to compensate for nonlinear changes in the center of gravity of the monitor.

7 Claims, 7 Drawing Sheets

TILT APPARATUS FOR A DISPLAY MONITOR

FIELD

This is a continuation of copending application Ser. No. 846,336 filed on 3-31-86 now U.S. Pat. No. 4,708,318.

FIELD

This invention relates generally to display monitor positioning apparatus, and more particularly to an apparatus for a video display monitor unit which allows the unit to be inclined or tilted readily by manual movement.

BACKGROUND

With the widespread use of computers and word processing systems in the workplace, there has been an increased concern over the ergonomics of these devices. Where an operator must spend long periods of time viewing a video display monitor, often without relief, it is paramount that the monitor be designed to provide a high level of operator comfort and convenience in its use. Most notably, it has been recognized that display monitors should provide for the ergonomical differences between operators and for differences in the environments in which these devices are used. Since one standard cannot suit all, display monitors must be adjustable to suit the needs of the individual operator in his individual working environment.

More specifically, for an operator using a video display monitor, varying lighting conditions in the workplace produce light reflections and glare which may in turn cause eyestrain and other detriments. To solve this problem it is desirable that the individual operator be able to adjust the tilt angle of the display monitor a few degrees forward and back in order to control glare from the screen and to achieve an optimum viewing angle. It is further desirable that the tilt angle be quickly and easily changed and that the new tilt angle be maintained with a minimum of hand operated locking devices. The prior art has addressed these problems in numerous ways.

One solution has been the tilt and rotate ball. An example of this apparatus is disclosed in U.S. Pat. No. 4,365,779 issued to Bates et al. The display monitor is supported on a stationary base by means of a spherical ball and socket joint which permits tilting and rotating of the monitor with respect to the base.

A very different design for a tilting monitor is disclosed in U.S. Pat. No. 4,368,867 issued to Pendleton et al. a display monitor has two pairs of elongated feet suspended from its bottom. The feet rest on the inclined surfaces of a pair of parallel, trapezoidal shaped base members joined together by a horizontal plate. The trapezoidal base members have step like indentations on their inclined surfaces, for holding the elongated feet, which correspond to the desired viewing angles. To change viewing angles, the monitor is moved incrementally up the step like indententation, basically in an arc.

Still another approach for varying the tilt angle of a display monitor is disclosed in U.S. Pat. No. 4,372,515 issued to Noonan. In this patent, a display monitor housing is mounted to a stationary pedestal base by means of a rack and spur gear arrangement, which allows a tilting movement of the monitor with respect to the pedestal base. This apparently allows the center of gravity of the monitor to be co located with its contact point on the pedestal base to thereby balance the monitor on the base.

Devices such as those discussed above are basically effective, although they suffer from certain disadvantages. All devices of this type generally include a base or pedestal support and some complex mechanism for mounting the display monitor thereon. This often results in a very expensive assembly which is bulky on an operator's desk. Some of the devices include detents which allow a tilt adjustment only in predefined increments or steps, rather than continuously throughout a tilt range, as would be more desirable. Many of the devices require the movement of the entire weight of the monitor to accomplish tilting. Still others require locking devices to keep the display monitor stationary once the tilt angle is set.

SUMMARY

In accordance with the present invention, a novel tilt apparatus is provided for a video display monitor whereby tilting of the monitor is obtained through a continuously variable tilt range of a few degrees forward and a few degrees backward. The tilt apparatus provides the operator with the simplest, fastest, most direct way of changing the tilt angle of a display monitor, and it requires no locking devices. Furthermore, it is extremely inexpensive and simple to manufacture, primarily because it requires no pedestal or base members to support the monitor.

The display monitor used with the present invention rests on a horizontal supporting surface, such as a desktop. The display monitor housing is provided with a pair of support legs on its bottom surface toward the front of the housing, which together function as a pivot point, so that the monitor is capable of pivoting through the desired range of tilt angles. The center of gravity of the display monitor is rearward of this pivot point. During tilting of the display monitor, the location of the center of gravity shifts, but it is always rearward of the pivot point.

The tilt apparatus of the present invention mounts to the display monitor housing at a point rearward of the pivot point and center of gravity and supports the rear end of the housing.

The tilt apparatus includes a tubular housing, a piston, a counterbalance spring and a frictional drag device, which act together as a counterbalancing mechanism. The tubular housing has an aperture on one end and is closed on the other end by an end cap. The piston is disposed for reciprocable movement within the tubular housing and has a shaft which extends through the aperture. The tubular housing is positioned vertically on the support surface, and the piston shaft, extending upwardly, connects by an attachment means to the display monitor housing.

The counterbalance spring is positioned within the tubular housing between the piston and the closed end such that downward movement of the piston compresses the spring. The spring has a predetermined length and spring constant for counterbalancing the weight of the display monitor throughout a predefined tilt range.

The frictional drag device within the tubular housing counteracts movement of the piston and spring due to nonlinear shifting of the center of gravity of the monitor at extreme tilt angles.

In operation, the tilt apparatus supports the rear end of the display monitor and counterbalances the moments of force about the pivot point from the shifting center of gravity of the monitor. The display monitor is thereby maintained in a state of static balance throughout its predefined tilt range.

In another aspect of the present invention, the tilt apparatus can be easily detached from the display monitor housing or almost fully retracted within it to allow the display monitor to be mounted on an auxiliary support device, such as a display monitor support arm. In this embodiment the tilt apparatus performs a locking function to securely hold the display monitor on the auxiliary device.

The tilt apparatus of the present invention can accommodate display monitors having different weights and dimensions, simply by changing the spring constant of the counterbalance spring, the stroke of the piston, and the frictional drag force to meet the various center of gravity characteristics of those monitors. Also, the tilt apparatus is a complete subassembly by itself, and it can be attached to many existing display monitors with no change in their basic design.

BRIEF DESCRIPTION OF THE DRAWINGS

The foregoing and other objects, features and advantages of the invention will be apparent from the following more particular description of a preferred embodiment of the invention, in conjunction with the accompanying drawings. In the drawings.

DESCRIPTION OF THE PREFERRED EMBODIMENT

Figure 1:
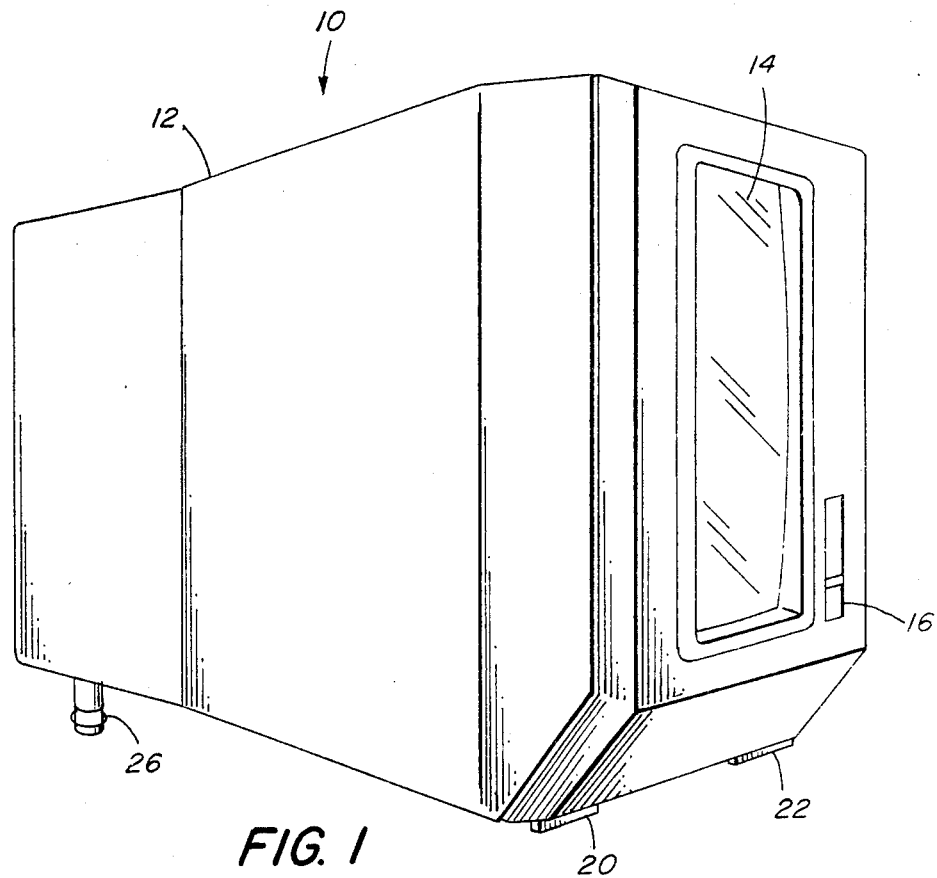
FIG. 1 is a perspective view of a display monitor using the tilt apparatus of the present invention.
Figure 2:
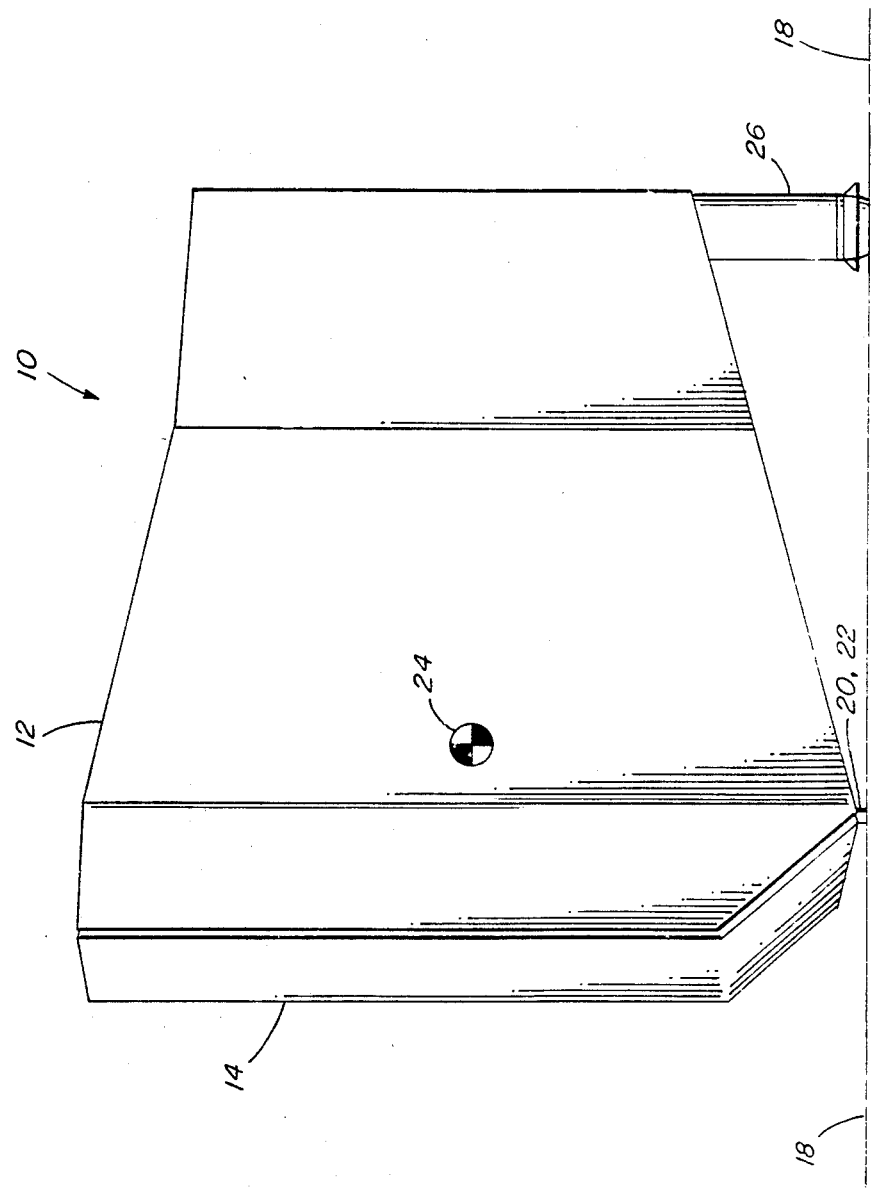
FIG. 2 is a side elevational view of the display monitor using the tilt apparatus of the present invention.

Referring now to FIG. 1 and FIG. 2, a display monitor 10 is shown which uses a tilt apparatus in accordance with the present invention. The display monitor 10 includes a monitor housing 12, a screen 14 for viewing by an operator, and a combined power switch and brightness control 16. Screen 14 consists of a twelve inch cathode ray tube, for what is customarily referred to as a half-page display.

The display monitor 10 is designed to rest on a desktop or other horizontal surface 18 with the screen 14 facing toward an operator. The display monitor 10 is used with a keyboard, not shown, which may be located in various positions in front of the monitor housing, as an operator may desire.

The internal electronic components of the display monitor 10 form no part of this invention and will not be disclosed herein, except as they pertain to the location of the center of gravity of the monitor 10.

Support legs 20 and 22 extend from the bottom of the housing 12 and have the function of supporting most of the display monitor s weight. The support legs 20 and 22 also function as a pivot point for tilting the monitor forward and backward, as desired. This relationship is most clearly illustrated in FIG. 2, which shows a side view of display monitor 10 in its normal, perpendicular screen position.

The display monitor housing 12 has a tilt range of twenty degrees, or five degrees forward from its normal, perpendicular screen position and fifteen degrees backward from the normal position. This optimum tilt range was determined by human factors engineering studies on the ergonomics of monitor displays, and can be considered somewhat standard for the industry, giving the operator the most desirable range of viewing angles.

In FIG. 2, the bottom surface of the monitor housing 12 is shown to slope gradually upward from the support legs 20 and 22 to the rearward end of the monitor housing 12. This slope allows the monitor to be tilted backward at least fifteen degrees from the normal position without the housing 14 contacting the horizontal surface 18 upon which it is placed. In a like manner, the housing 12 is sloped upward in front of the supports 20 and 22 to allow the monitor 10 to be tilted forward at least five degrees forward without contacting the horizontal surface 18.

The center of gravity (C.G.) 24 for display monitor 10 is located generally toward the front of the unit because most of the weight of the display monitor resides in the cathode ray tube and printed circuit boards, which are physically located toward the front. However, as shown in FIG. 2, the location of the C.G. 24 is above and slightly to the rear of the pivot point established by the support legs 20 and 22.

A tilt apparatus 26 is shown extending from the bottom surface of the monitor housing 12 toward the rear of the housing. Its function is to counterbalance rotational forces due to the shift in the location of the C.G. of the display monitor 10 as it pivots forwardly and backwardly on the support legs 20 and 22.

In FIG. 3 through 6, the tilt apparatus of the present invention is shown in more detail. The tilt apparatus includes a tubular housing 28, a piston 30, a end cap 32, a counterbalance spring 34, drag washers 36, and a retainer ring 38.

Figure 3:
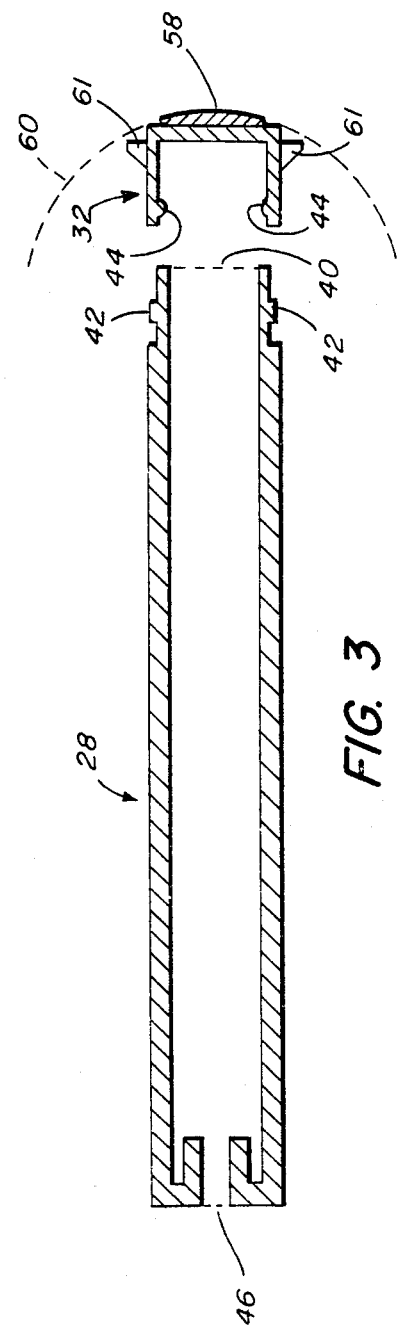
FIG. 3 is a cross sectional view of the tubular housing and end cap of the tilt assembly.

Referring to FIG. 3, it will be seen that the tubular housing 28 is a hollow cylinder with a near constant inner diameter, or zero draft. It is molded in medium impact styrene, chosen because of its durability. One end of housing 28 is an open end 40. The open end 40 has a slightly decreased outside diameter to allow for the fitting of the end cap 32 thereon. A circular lip 42 is provided to coact with a similar circular lip 44 on the inside of end cap 32 to provide a snap fit. The other end of tubular housing 28 contains has an aperture 46 having a diameter appropriate for receiving the shaft of piston 30.

Figure 4:
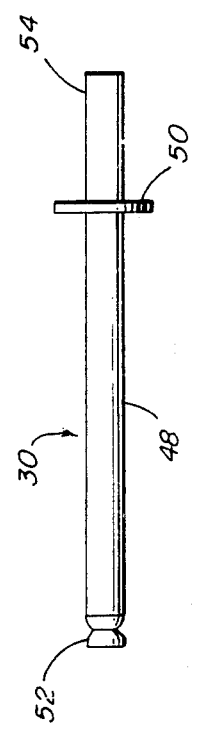
FIG. 4 is a side elevational view of the piston.

Referring now to FIG. 4, the piston 30 consists of a shaft 48 with a molded-in shoulder 50, a chamfered piston tip 52, and a shaft extension 54. The piston 30 is disposed for reciprocable movement within tubular housing 28 with the shaft 48 extending through the aperture 46. The diameter of the shoulder 50 is slightly less than the inside diameter of the housing 28 to allow the piston 30 to slide within the housing. The piston 30 itself is made of acetyl plastic, a material which has very good lubricity characteristics and allows the piston 30 to slide smoothly within the styrene housing without the need for lubricants of any kind.

The shaft extension 54 is provided for the mounting of the drag washers 36. Once secured to the piston 30, the drag washers 36 act upon housing 28 to produce frictional drag. Chamfered piston tip 52 engages a molded in spring clip in the monitor housing 12, to providing anchoring of the piston shaft 48 as will be explained below. During operation of tilt apparatus 26, the piston 30 remains stationary with respect to the monitor housing 12.

Figure 5:
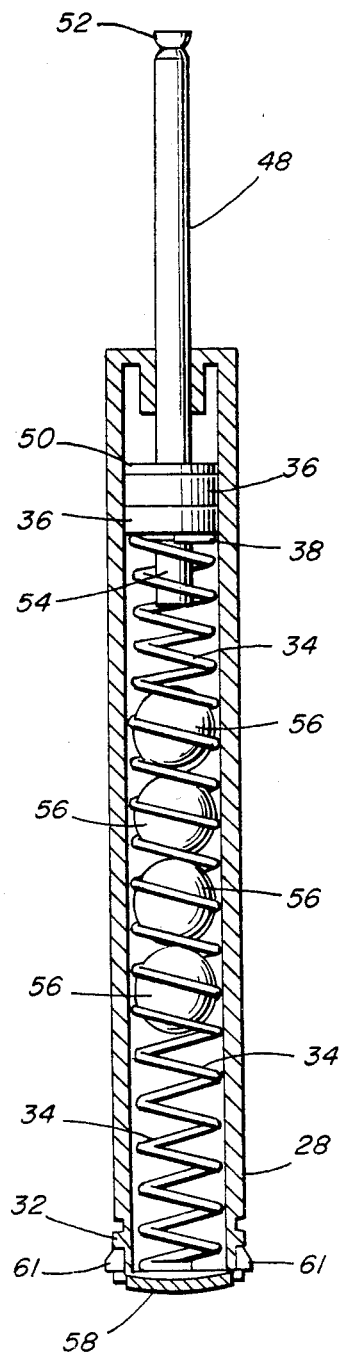
FIG. 5 is a partially sectional, elevational view showing the interior arrangement of components of the tilt apparatus.
Figure 6:
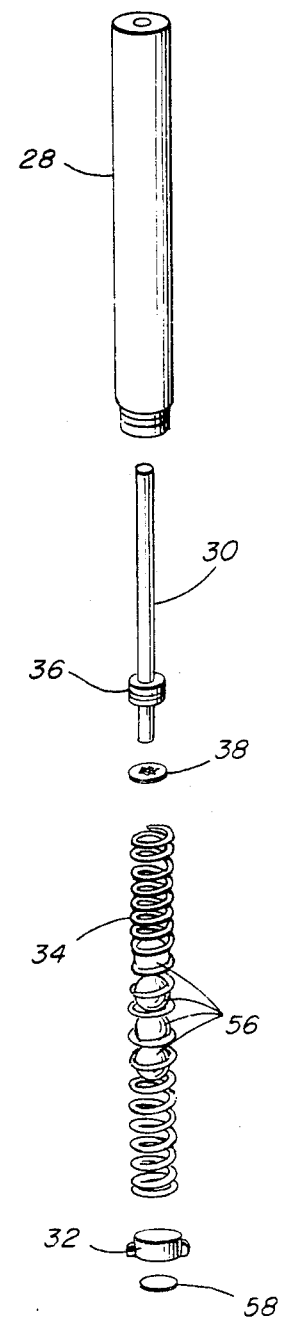
FIG. 6 is an exploded view of the tilt apparatus, showing its method of assembly.

The counterbalance spring 34, shown in FIG. 5 and FIG. 6, is a standard steel compression spring made of music wire, having a spring constant (k) of 1.55 pounds/inch. The spring 34 has a coil diameter slightly less than the inside diameter of tubular housing 28. It is inserted in the housing 28, with its ends bearing against the drag washers 36 on one end and the end cap 32 on the other.

In its normal, uncompressed state, the counterbalance spring 34 is one inch longer than the inside length of tubular housing 28 with the piston 30 and drag washers 36 already installed. Therefore, when the tilt apparatus is assembled and the end cap 32 installed, the counterbalance spring 34 is initially compressed one inch. This gives the spring 34 an initial or preloading force of 1.55 pounds. When the display monitor 10 tilts forward, the preloading of spring 34 acts to extend the tilt apparatus fully, forcing the piston all the way out against the stop.

As the display monitor tilts backward, spring 34 is compressed a maximum of 3.25 inches, and the spring force on the piston increases from the initial 1.55 pounds to a maximum of approximately 6.6 pounds. The spring force on the piston for any position of the display monitor may be calculated by the following formula:

$$F_{TA} = kx + F_i$$

where $F_{TAt}$=Total spring force of Tilt Apparatus (lbs)
k=spring constant (1.55 lb/in)
x=deflection distance of spring (inch)
$F_i$=initial loading force (1.55 lbs.)

This force range (1.55-6.6) for spring 34 corresponds to the required force needed to counterbalance the display monitor through the tilt range of five degrees forward of normal to fifteen degrees back.

The counterbalance spring 34 has a normal length that falls within the constraints imposed by the length of tubular housing 28 (to support the monitor), the required stroke of piston 30 (to provide the monitor with a twenty degree tilt range), and the required counterbalancing force. Within the constraints imposed, the normal length of the spring (6.75 inches) has been maximized in order to provide the most linear change in force obtainable. This, in turn, provides smoothest possible operation of the tilt apparatus.

During assembly of the tilt apparatus, just prior to installing the counterbalance spring 34 in the housing 28, four spring dampers 56 are centered within the coils of spring 34. The spring dampers 56 are balls of soft rayon. Rayon has the sound dampening properties of cotton and is more durable under varying environmental conditions. The dampers 56 eliminate noises or squeeks from spring 34 resonating on the inside wall of the housing 28 by insulating the spring 34 from the housing and absorbing the spring resonance. The rayon balls dampen the sound, while not affecting the spring rate.

Counterbalance spring 34 has a linear force range which counterbalances the C.G. shift of the display monitor 10, except at the most rearward tilt angles, where the C.G. shift becomes slightly nonlinear. This slight nonlinearity of the C.G. shift will affect the static balance. Other factors may affect the static balance by altering the C.G. of monitor 10. For example, the desktop upon which the display monitor rests might be non level, or tolerances in the assembly of the display monitor could alter the monitor's C.G. characteristics.

To counteract these undesirable effects, drag washers 36 are provided on shaft extension 54 to provide a frictional load against the inside wall of the housing 28 and thereby aid in holding the display monitor 10 at the desired tilt angle.

The drag washers 36 are composed of a woven fabric of polyester fiber, which has very good wear and drag characteristics in addition to low cost. A suitable material for use in this application is Style No. XT863792R Polyester manufactured by Tex Tech Industries of Auburn, Me. Drag washers made of this material have been tested to over 50,000 cycles with no perceptable wear.

The drag washers 36 are cut on a multiple drill press with a specially designed cutter which makes concentric washers having a diameter slightly greater than the inside diameter of housing 26 and a center hole with a diameter slightly greater than the diameter of the shaft extension 54.

A metal push-on retainer ring 38 holds the drag washers 36 against shoulder 50 on the shaft extension 54. This relationship can best be seen in FIG. 5. The amount of drag force is controlled by adjusting the amount of compression applied to the drag washers 36 by means of the retainer ring 38. As the drag washers 36 are compressed by retainer ring 38, their diameter increases slightly, providing greater drag against the inside wall of housing 28. In the preferred embodiment, between 1.0 and 1.25 pounds of drag was found to be desirable throughout the full tilt range of the monitor. To simplify assembly, a tool may be used to set the retainer ring 38 against the drag washers 36 at the proper height for the desired compression.

The end cap 32 snap fits over the open end 40 of the tubular housing 28. Use of the end cap 32 greatly simplifies assembly procedures for the tilt apparatus 26, as can be appreciated by consideration of FIG. 6. The piston 30, with drag washers 36 and retainer ring 38 already installed, is inserted into the open end 40 of tubular housing 28, followed by the counterbalance spring 34 with spring dampers 56. The end cap is then snap fit over the tubular housing 28.

The circular lip 42 on the housing 26 engages a similar lip 44 on the inside of the end cap 32 to ensure a tight grip, as can best be seen in FIG. 2. The force required to remove the end cap 32 must be greater than the axial force developed in the counterbalance spring 34 during maximum compression, so that the end cap 32 will not pop off. In the preferred embodiment, to prevent any possible operator injury from the end cap 32 inadvertently coming off, the end cap 32 is designed to withstand 25 pounds of axial force, a safety factor in the three to four range.

The tilt apparatus 26 contacts a desktop or other horizontal surface with end cap 32. A rubber pad 58 is attached by means of an pressure sensitive adhesive to the end cap 32 to prevent sliding on a table surface. As the monitor is moved throughout its tilt range, the tilt apparatus 26 pivots on the desktop, and rubber pad 58 provides a pivot surface producing increased friction, so that the tilt apparatus 26 does not skid on the desktop. The surface of the rubber pad 58 includes a slight curvature with a three inch spherical radius 60 to accommodate the pivoting; so that, for example, when the display monitor 10 is tilted from a normal position to a backward position, the contact point of the rubber pad 58 on the desktop rotates from dead center of the rubber pad 58 to a position further back.

Locking tabs 61 on end cap 32 are provided so that the display monitor 10 may be mounted on an alternative support means. This will be described in more detail further on.

Figure 7:
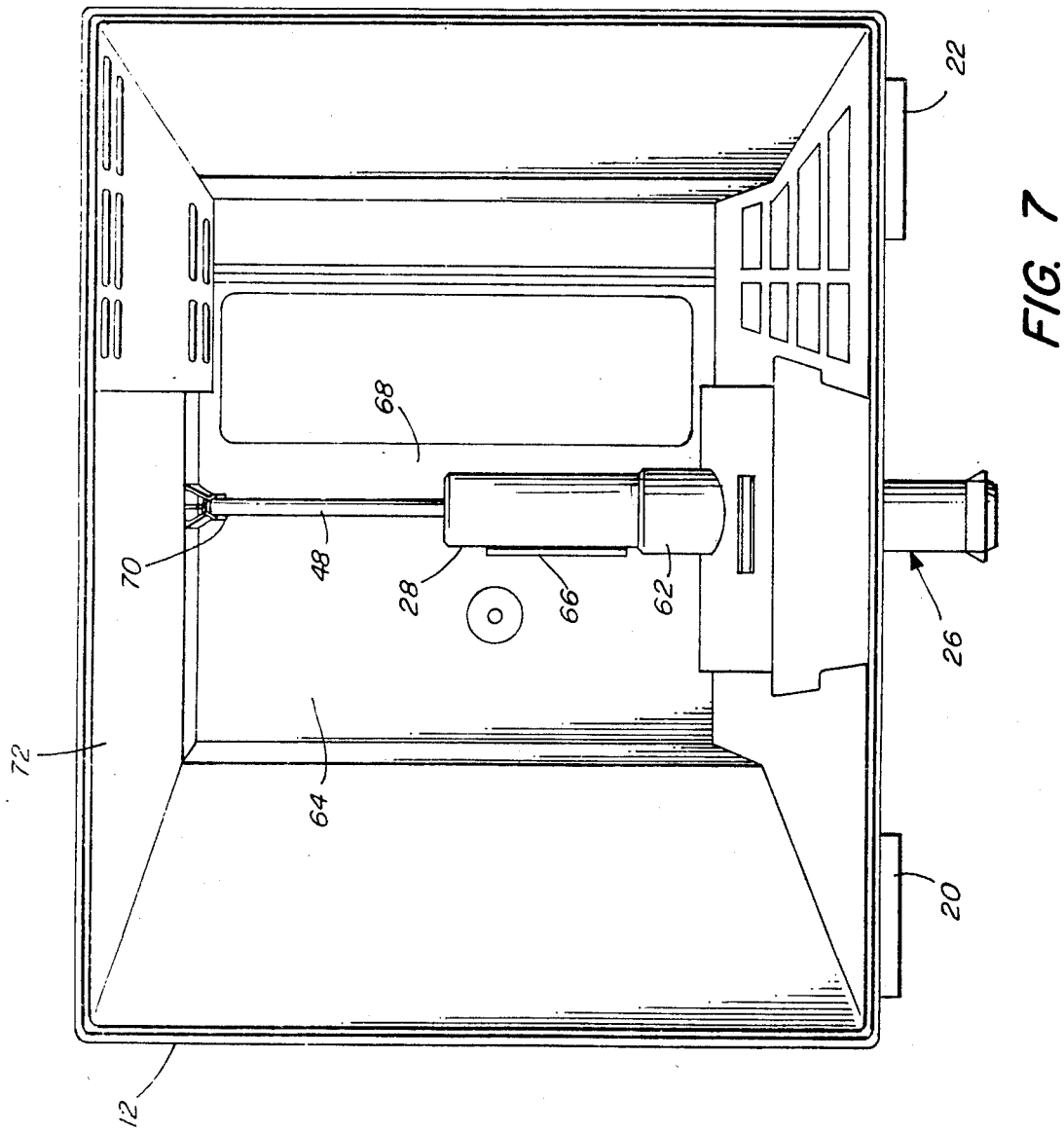
FIG. 7 is a front view of the interior of the display monitor housing, with electronic components removed, showing the mounting of the tilt apparatus therein.

Referring now to FIG. 7, there is shown the means by which the tilt apparatus 26 is anchored to the display monitor housing 12. This figure views the interior of the display housing 12 with the CRT all electronic components removed. The tilt apparatus 26 extends through a generally circular access port and collar 62 which is molded into the bottom of monitor housing 12 against rear wall 64. The collar has a diameter such that the tubular housing 28 may slide loosely within it, without adding significant frictional drag to the tubular housing 28. Located on the rear wall 64 of housing 12 are guides 66, 68, which serve to hold the tubular housing 28 parallel to the rear wall 64, with the piston shaft 48 extending upwardly. The chamfered piston tip 52 engages a spring clip 70 that is molded into the top wall 72 of the display housing 12 and holds the tilt apparatus 26 securely in the display housing 12. The guides 66, 68 reduce the amount of play in collar 62 so that, during installation, the chamfered piston tip 52 will line up more easily with the spring clip 70. During operation of the tilt apparatus 26, the tubular housing 28 moves upwardly or downwardly, and the piston 30 remains stationary with respect to the display housing 12.

The tilt 26 apparatus can be removed simply by grasping the tubular housing 28 and gently pulling downwardly until the chamfered piston tip 52 disengages from spring clip 70, and it can be reinstalled by reversing the procedure. This simple installation and removal is accomplished without the use of tools.

Figure 8:
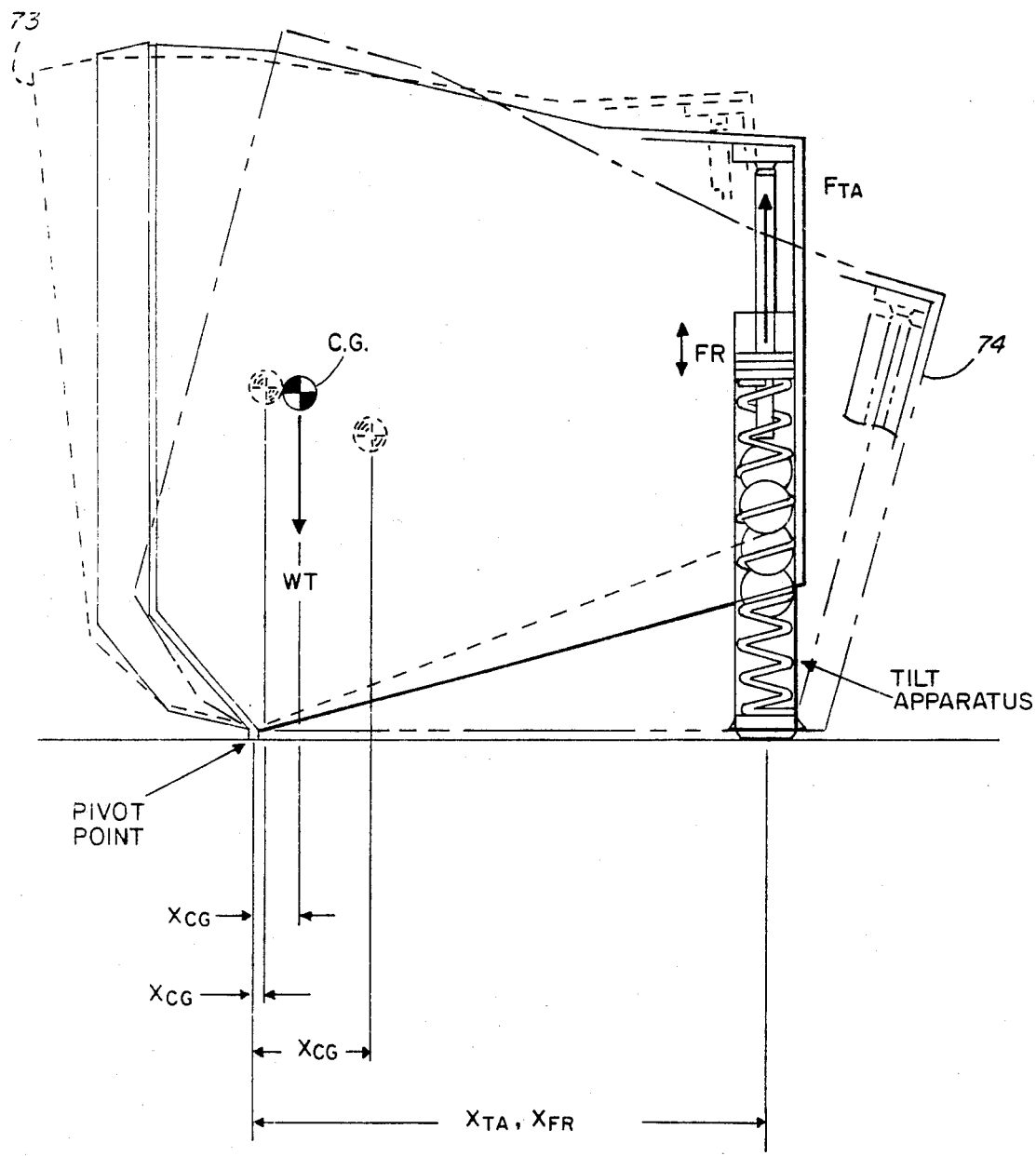
FIG. 8 is a functional diagram illustrating the shift in center of gravity of the display monitor housing with changes in tilt.

FIG. 8 illustrates in more detail the relationship between tilt angle, C.G., and counterbalance force.

As will be well known to those skilled in the art, the C.G. is, most simply, that point at which the sum of the rotational forces acting on a rigid body is equal to zero. In the preferred embodiment, the C.G. of display monitor 10 is always located at a point to the rear of the pivot point defined by the support legs 20 and 22. As the display monitor 10 tilts forward, its C.G. also moves forward; as display monitor 10 tilts backward, its C.G. also moves backwards. In FIG. 8, dotted line representations show the display monitor 10 in the five degrees forward position 73, and the fifteen degrees backward position 74. For each tilt angle, the location of the associated C.G. is also represented.

The C.G. of the display monitor 10 was determined in the three positions experimentally by placing the display monitor on a horizontal surface and using a pivot rod to determine the points at which the display monitor balanced, first on the front surface and then on the bottom surface at the three tilt angles. Perpendicular lines were drawn from the front surface and bottom surface for each angle. The C.G. for each tilt position is the point at which the lines intersected.

If the C.G. of display monitor 10 were concentrated directly above the pivot point, the sum of rotational forces would equal zero, and the monitor would be balanced over supports 20 and 22. In the preferred embodiment, however, a moment of force always exists, having a magnitude defined by the weight of the display monitor times the horizontal distance between from the pivot point to a perpendicular line drawn from the location of the C.G.

By referring to FIG. 8, it will be appreciated that the C.G. creates a clockwise rotating force around the pivot point and must be counterbalanced by an equal counterclockwise rotating force from the tilt apparatus 26. Static balance is normally achieved when the sum of the forces balance out to zero. However, because of the frictional force applied by the drag washers 36, the plus and minus moments need not balance precisely. Static balance will be achieved as long as the absolute value of the moments about the pivot point is less than or equal to the absolute value of the moment due to the drag washers 36.

The formula governing the static balance is as follows:

$$M_A = [-WT(X_{CG}) + F_{TA}(X_{TA})] = FR(X_{FR})$$

where:
$M_A$ = Sum of the moment around pivot point (inch lb)
$X_{CG}$ = Distance from pivot point to the C.G. (inch)
$X_{TA}$ = Distance from pivot point to Tilt Apparatus (8.83 inch)
$X_{FR}$ = Distance from pivot point to drag washers (8.83 inch)
$F_{TA}$ = Total spring force of Tilt Apparatus (lbs)
F = Spring force of counterbalance spring (lbs)
FR = Friction force of drag washers in tilt apparatus (lbs)
WT = Weight of display monitor (16.5 lbs)

When it becomes desirable for the operator to adjust his viewing angle, the display monitor 10 may be tilted to any angle within the predefined continuous tilt range simply by placing a hand on the top front portion of the display monitor housing 12 and applying a slight forward or backward pressure to the housing. The display monitor 10 will remain at the tilt angle chosen without any locking devices. The display monitor 10 can also be swiveled on the support legs 20, 22 and tilt apparatus 26 to achieve the optimum viewing orientation for the operator.

Figure 10:
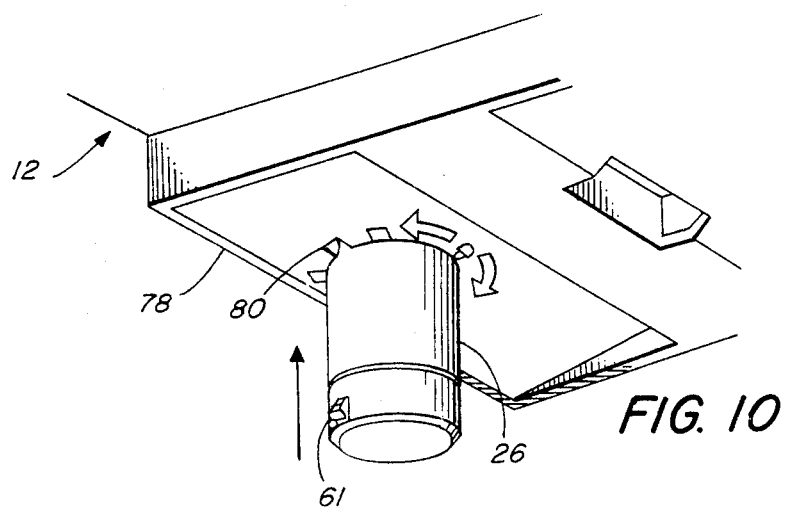
FIG. 10 is another view of the alternative embodiment shown in FIG. 9, illustrating how the tilt apparatus inserts through a display monitor support arm base to function as a locking device.
Figure 9:
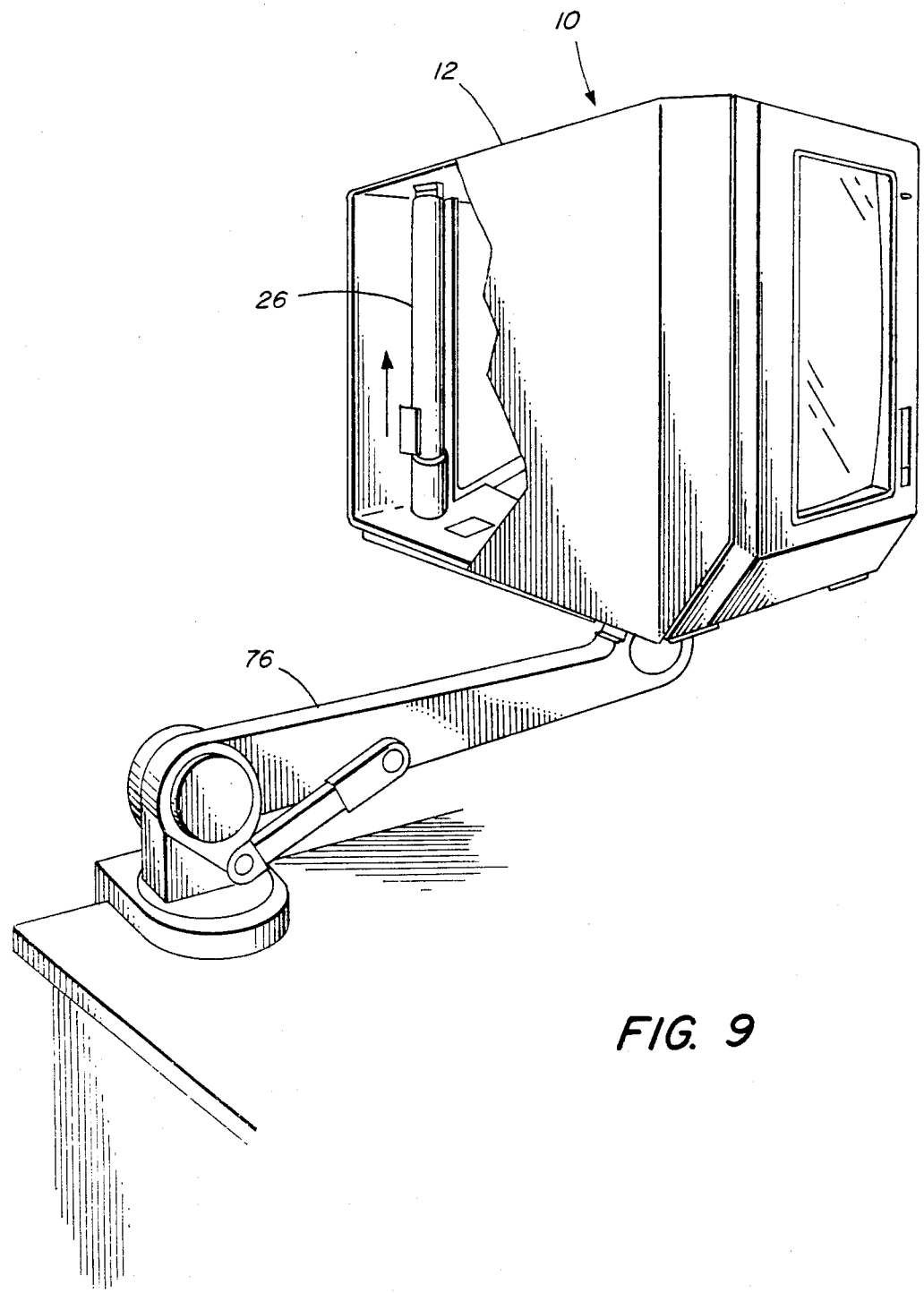
FIG. 9 is a perspective view of an alternative embodiment of the present invention, showing the tilt apparatus functioning as a locking device on a display monitor support arm.

Referring now to FIG. 9 and FIG. 10, the tilt apparatus 26 is shown to be functioning as a locking pin for mounting the display monitor 10 on an auxiliary support device, such as a display monitor support arm 76.

Conventionally, display monitors are mounted on display monitor support arms by means of mounting hardware which is often cumbersome for an operator to install or remove. Here, the present invention simplifies this mounting and adds greatly to the versatility of display monitor 10, which may now function on a desktop or on a support arm, as the operator may desire.

Installation of the display monitor 10 on the display monitor support arm 76 is accomplished by removing the tilt apparatus 26 from the housing 12, sliding the display monitor housing 12 onto the support arm base 78 which contains an aperture therein, and then reinserting the tilt apparatus. The tilt apparatus is manually pushed into the display monitor housing 12 until it is in its fully retracted position, as shown in FIG. 9. The tilt apparatus is then rotated forty five degrees, which engages locking tabs 61 of end cap 32 in recessed slots 80 (one of two shown in FIG. 10). The display monitor 10 is now securely fastened to the display monitor support arm 76. The display monitor 10 can easily be removed from the display monitor support arm 76 by removing the tilt apparatus 26, where it could easily be converted to a desktop unit once again.

In view of the above, it will be seen that the several objects of the present invention are readily achieved and other advantageous results attained.

Obviously many modifications and variations of the present invention are possible in light of the above teachings, without departing from the spirit and scope of the invention. For example, the counterbalance principle of the present invention might be accomplished by a more expensive gas piston, rather than by the means disclosed in the preferred embodiment above. It is also within the scope of the present teaching to provide brackets and the like to attach the tilt apparatus of the present invention to existing display monitors. It is also contemplated that, in the place of drag washers 36, an externally adjustable, spring loaded device could be used to provide frictional drag to the piston 30.

In view of this, it is understood that the above description is illustrative rather than limiting.

What is claimed is:

1. Apparatus for supporting a display monitor in any position within a continuous range of tilt angles comprising means for supporting a display monitor for pivoting on a supporting surface through a continuous range of tilt angles, the supporting means being positioned forward of the center of gravity of the display monitor; and spring means, positioned rearward of the center of gravity of the display monitor, for balancing the rear end of the display monitor in any position within the continuous range of tilt angles;

the spring means having a force range for counterbalancing the weight of the display monitor in any position within said continuous range.

2. Apparatus as recited in claim 1 wherein said supporting means includes at least one support leg.

3. A display monitor, adjustable through a continuous range of tilt angles, comprising a monitor housing for mounting of a cathode ray tube and display monitor electronics therein;

support means on the bottom of the monitor housing for pivoting the monitor on a supporting surface through a continuous range of tilt angles, the support means being position forward of the center of gravity of the monitor; and spring means, positioned rearward of the center of gravity of the display monitor, for balancing the rear end of the display monitor in any position within the continuous range of tilt angles;

the spring means having a force range for counterbalancing the weight of the display monitor in any position within said continuous range.

4. Apparatus for supporting a display monitor in any position within a continuous range of tilt angles comprising means for supporting a display monitor for pivoting on a supporting surface through a continuous range of tilt angles, the supporting means being positioned forward of the center of gravity of the display monitor; and counterbalance means for balancing the rear end of the display monitor in any position within the continuous range of tilt angles, the counterbalance means including a supporting member, slidably mounted to the monitor housing, rearward of the center of gravity of the display monitor, for contacting said support surface; and a spring coupled to the support member for urging the member downwardly into contact with the support surface with a force equal to the weight of the display monitor at said member for any angle of tilt within said continuous range;

whereby the counterbalance means compensates for shifts in the center of gravity of the monitor, and the monitor is maintained in static balance at any desired angle within said continuous range.

5. A display monitor, adjustable through a continuous range of tilt angles, comprising a monitor housing for mounting a cathode ray tube and display monitor electronics therein;

support means on the bottom of the monitor housing for pivoting the monitor on a supporting surface through a continuous range of tilt angles, the support means being positioned forward of the center of gravity of the monitor; and counterbalance means for balancing the rear end of the display monitor in any position within the continuous range of tilt angles, the counterbalance means including a support member, slidably mounted to the monitor housing, rearward of the center of gravity of the display monitor, for contacting said support surface; and a spring coupled to the support member for urging the member downwardly into contact with the support surface with a force equal to the weight of the display monitor at said member for any angle of tilt within said continuous range;

whereby the counterbalance means compensates for shifts in the center of gravity of the monitor, and the monitor is maintained in static balance at any desired angle within said continuous range.

6. A display monitor as recited in claim 5, further including frictional drag means for counteracting effects due to non-level surfaces and tolerances.

7. The display monitor of claim 5, wherein the support member functions as a locking pin to secure the display monitor on a display monitor support arm.

* * * * *